(12) United States Patent
Blair et al.

(10) Patent No.: US 10,069,795 B2
(45) Date of Patent: Sep. 4, 2018

(54) MESSAGE RECEIPT THROUGH FIREWALL

(71) Applicant: Hewlett-Packard Development Company, L.P., Houston, TX (US)

(72) Inventors: Timothy P Blair, Boise, ID (US); David Smith, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 147 days.

(21) Appl. No.: 15/320,231

(22) PCT Filed: Jun. 27, 2014

(86) PCT No.: PCT/US2014/044750
§ 371 (c)(1),
(2) Date: Dec. 19, 2016

(87) PCT Pub. No.: WO2015/199737
PCT Pub. Date: Dec. 30, 2015

(65) Prior Publication Data
US 2017/0155621 A1    Jun. 1, 2017

(51) Int. Cl.
*H04L 29/06* (2006.01)
*H04L 12/58* (2006.01)
(52) U.S. Cl.
CPC .......... *H04L 63/0236* (2013.01); *H04L 51/04* (2013.01); *H04L 63/168* (2013.01)
(58) Field of Classification Search
None
See application file for complete search history.

(56) References Cited

U.S. PATENT DOCUMENTS

| | | | | |
|---|---|---|---|---|
| 6,377,993 B1* | 4/2002 | Brandt | ............... | G06F 11/0709 707/E17.107 |
| 6,714,979 B1* | 3/2004 | Brandt | ................. | H04L 63/166 707/999.003 |
| 7,181,017 B1* | 2/2007 | Nagel | .................. | H04L 9/0825 380/282 |
| 7,225,249 B1* | 5/2007 | Barry | ................. | G06F 17/3089 709/227 |
| 7,418,504 B2* | 8/2008 | Larson | ............. | H04L 29/12066 709/226 |

(Continued)

OTHER PUBLICATIONS

Lobashov, Maxim; Pratl, Gerhard; Sauter, Thilo. Applicability of Internet Protocols for Fieldbus Access. 4th IEEE International Workshop on Factory Communication Systems. Pub. Date: 2005. https://ieeexplore.ieee.org/stamp/stamp.jsp?tp=&arnumber=1159718.*

(Continued)

*Primary Examiner* — Jeremiah Avery
(74) *Attorney, Agent, or Firm* — HP Inc. Patent Department

(57) ABSTRACT

Examples disclosed herein relate to unwrap a message received from a remote management service in a first device and to provide the message to a second device. Examples include a first message received in a first device from a remote management service through a firewall, which is unwrapped into a second message. The second message is provided to its destination. In examples, the second message is received in the first device and unwrapped into a third message. The third message is provided to a second device.

15 Claims, 3 Drawing Sheets

(56) References Cited

U.S. PATENT DOCUMENTS

| | | | | |
|---|---|---|---|---|
| 7,987,274 | B2* | 7/2011 | Larson | H04L 63/0876 709/227 |
| 8,149,431 | B2 | 4/2012 | Barton et al. | |
| 8,161,162 | B1 | 4/2012 | Sutherland et al. | |
| 8,261,057 | B2* | 9/2012 | Sundarrajan | H04L 63/0272 713/151 |
| 8,570,550 | B2 | 10/2013 | Pothos et al. | |
| 9,231,891 | B2* | 1/2016 | Thakkar | H04L 12/4633 |
| 2002/0087383 | A1* | 7/2002 | Cogger | G06F 11/0709 709/223 |
| 2006/0195895 | A1 | 8/2006 | Ben-Shachar et al. | |
| 2007/0022164 | A1 | 1/2007 | Nog et al. | |
| 2007/0291789 | A1 | 12/2007 | Kutt et al. | |
| 2008/0189781 | A1 | 8/2008 | Pathak et al. | |
| 2009/0064291 | A1* | 3/2009 | Wahl | H04L 63/0815 726/5 |
| 2011/0047236 | A1* | 2/2011 | Daigle | G06F 17/30861 709/206 |
| 2011/0099619 | A1 | 4/2011 | Jewell | |
| 2011/0258432 | A1* | 10/2011 | Rao | H04L 63/08 713/150 |
| 2012/0136461 | A1 | 5/2012 | Satoh | |
| 2014/0040979 | A1* | 2/2014 | Barton | H04L 63/20 726/1 |

OTHER PUBLICATIONS

Hwang, Junseok; Altmann, Jorn; Okumus, Ibrahim; Aravamudham, Praveen. Transaction Management for Sender/Receiver-Payment Schemes in Charging and Accounting Systems for Interconnected Networks. 2004 IEEE/IFIP Network Operations and Management Symposium. Pub Date: 2004. https://ieeexplore.ieee.org/stamp/stamp.jsp?tp=&arnumber=1317743.*

Gorlatova, Maria et al. Detecting Wormhole Attacks in Mobile Ad Hoc Networks through Protocol Breaking and Packet Timing Analysis. 2006 IEEE Military Communications Conference—MILCOM 2006. Pub. Date: 2006. https://ieeexplore.ieee.org/stamp/stamp.jsp?tp=&arnumber=4086522.*

Djahandari, Kelly; Sterne, Daniel F. An MBone Proxy for an Application Gateway Firewall. Proceedings of the 1997 IEEE Symposium on Security and Privacy. Pub. Date: 1997. https://ieeexplore.ieee.org/stamp/stamp.jsp?tp=&arnumber=601318.*

Wolber, A. "Print anywhere: Chrome, Google Apps and Cioutt Print," (Research Paper) Oct. 9, 2012, 8 pages, http://www.techrepublic.com/.

* cited by examiner

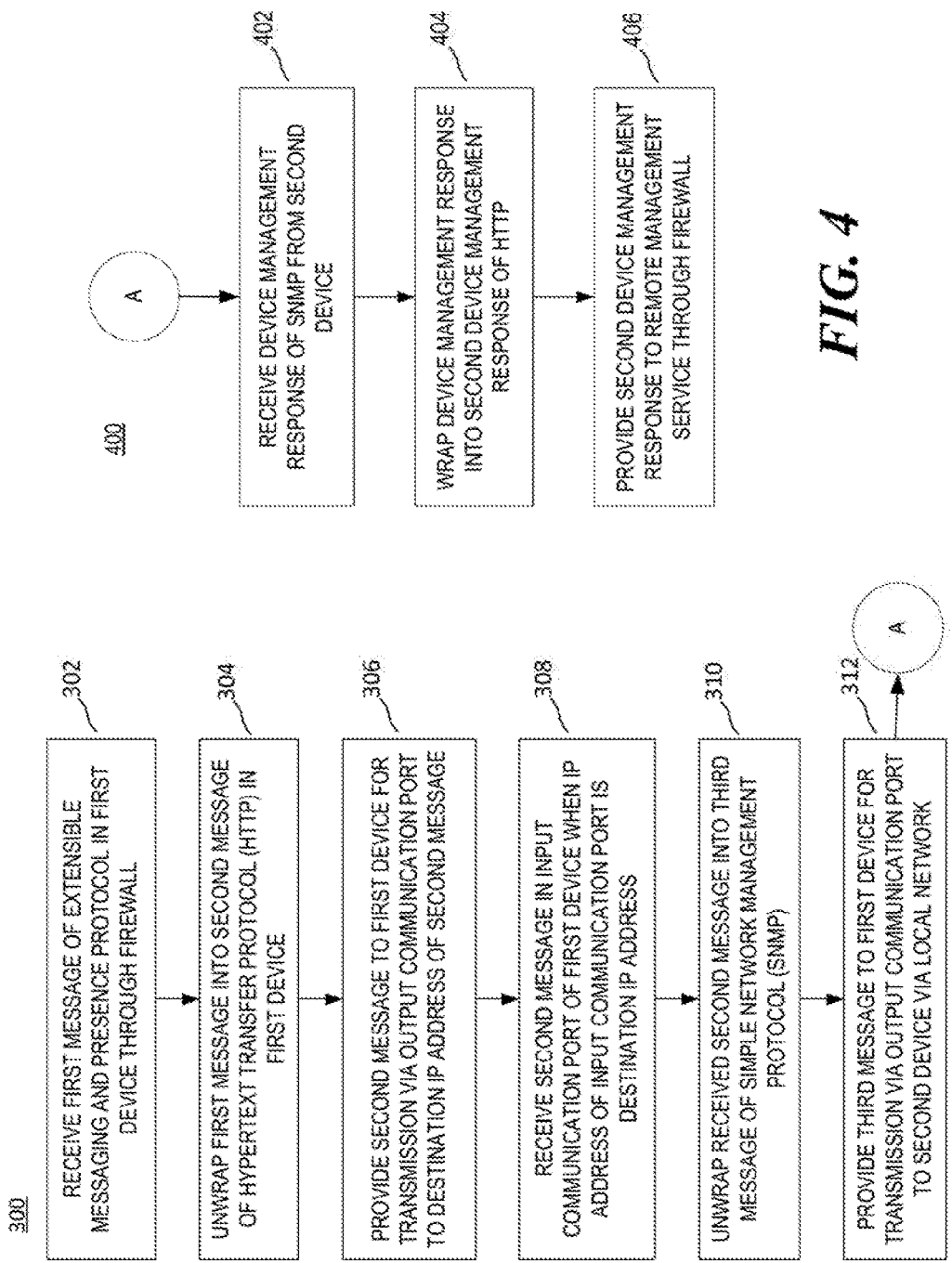

MESSAGE RECEIPT THROUGH FIREWALL

BACKGROUND

Various types of devices, communicating over different protocols, may be used in a networked environment. A remote service may communicate with and monitor a networked environment protected by a firewall through a specific set of communication protocols. In some examples, a networked device may initiate communication with the remote service through a firewall and forward received messages to other networked devices.

BRIEF DESCRIPTION OF THE DRAWINGS

The following detailed description references the drawings, wherein:

FIG. 3 is a flowchart of an example method for providing a device management request to a networked device from a remote management service; and FIG. 4 is a flowchart of an example method for providing a device management response to a remote management service which may be incorporated into the flowchart of FIG. 3.

DETAILED DESCRIPTION

Figure 1:
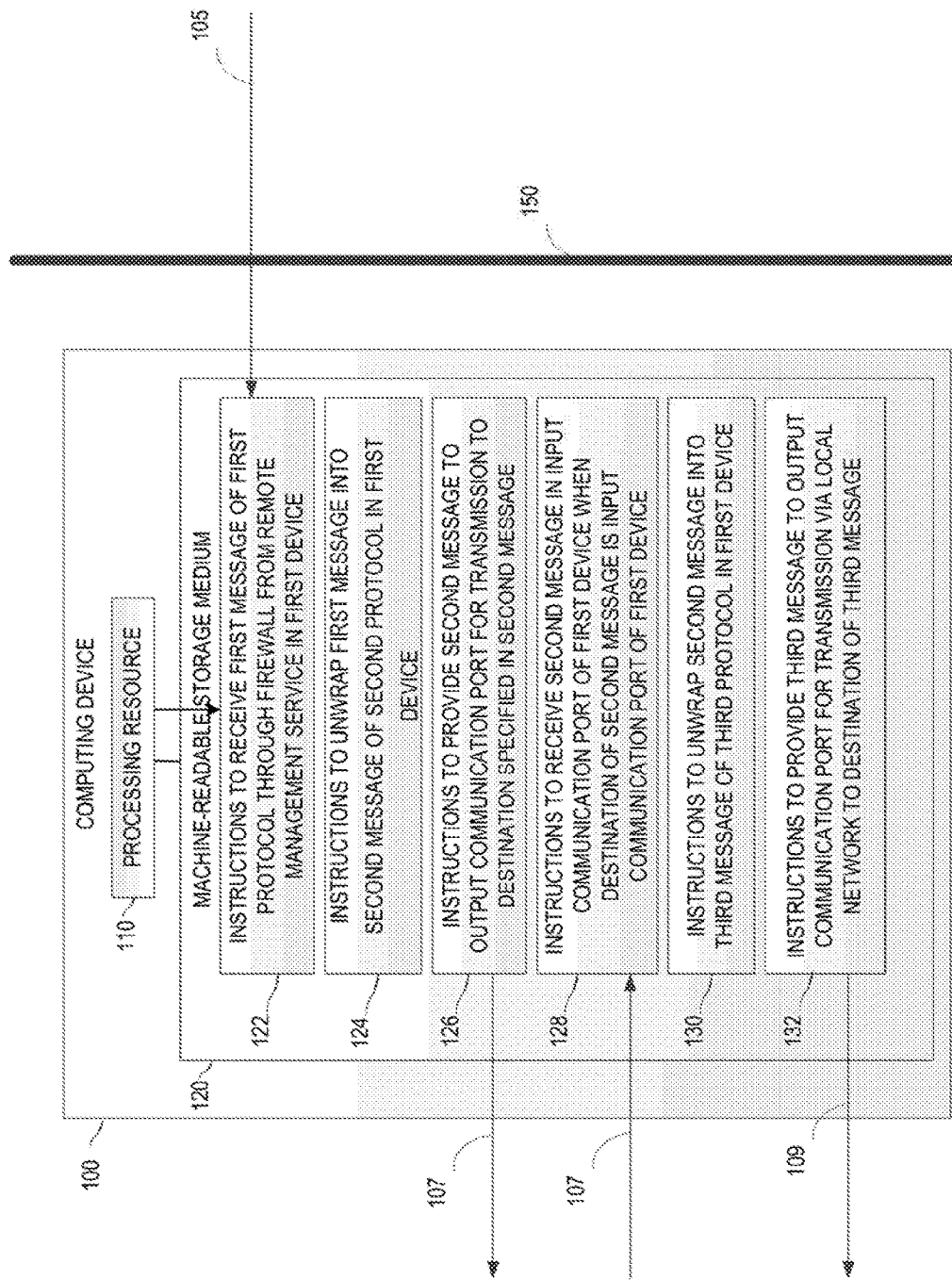
FIG. 1 is a block diagram of an example computing device to provide a device management request from a remote management service to a networked device.

As used herein, a "device management request" (or "management request") is an instruction (i.e., command) executable by a computing device to perform at least one function within the computing device. A "computing device" or "device" may be a desktop computer, laptop (or notebook) computer, workstation, tablet computer, mobile phone, smart device, server, blade enclosure, imaging device, or any other processing device or equipment. An "imaging device" may be a hardware device, such as a printer, multifunction printer (MFP), or any other device with functionalities to physically produce representation(s) (e.g., text, images, models, etc.) on paper, photopolymers, thermopolymers, plastics, composite, metal, wood, or the like. In some examples, an MFP may be capable of performing a combination of multiple different functionalities such as, for example, printing, photocopying, scanning, faxing, etc. For example, the function within an imaging device may be to reboot the imaging device, troubleshoot the imaging device, upgrade firmware, retrieve consumable level information, clone features, adjust security settings, perform a test, retrieve a scan, execute a print request, clear an alert, etc.

A device management request may be a real time management request. As used herein, a "real time" management request refers to a function of a message in which a response to the message is requested from the destination device in real time. For example, a real time management request may be understood to control an imaging device receiving the request to receive data, process the data, and return the results of the process sufficiently quickly to affect the imaging device at that time (e.g., in milliseconds).

In examples described herein, a "remote management service" may be a service implemented by at least one device to generate and provide a device management request to a computing device in a remote location (i.e., not directly connected to the remote management service) protected by a firewall. A "firewall" may be a network security system that controls incoming and outgoing network traffic based on an applied set of rules. All communications (e.g., data packets) which flow in and out of the network must pass through the firewall. The firewall may selectively permit the communications to pass (e.g., based on protocols) from one network to another to provide bidirectional security. A firewall may establish a barrier between an internal network and an external network (e.g., the Internet). The internal network may include, for example, a local area network (LAN), a wireless local area network (WLAN), a virtual private network (VPN), or the like, or a combination thereof. For example, given the variety of different functions that may be desired, a remote management service may generate a management request to an imaging device protected by a firewall to enter tow power mode at a particular time. In such examples, a responsive message from the imaging device may be sent to the remote management service to confirm the management request has been received or implemented, and/or provide the results of the implementation of the management request, such as an error message. As used herein a "device management response" may refer to a responsive message from the computing device to the remote management service.

A remote management service may manage a plurality of computing devices behind a firewall. However, not all computing devices may be able to communicate through the firewall with the remote management service. For example, some imaging devices may not be able to communicate with an external network (e.g., the Internet). In such examples, a secondary device in the networked environment may be used to communicate with some imaging devices. The secondary device may forward messages from the remote management service to the imaging device. However, in order to forward messages via the secondary device, the secondary device and the remote management service must establish a connection through the firewall. In order to establish this connection, secondary devices may request a connection to the remote management service (e.g., to "poll" the remote management service). The remote management service may respond to the connection request and establish a connection with the second device through the firewall. Such a connection scheme may require sophisticated programming logic to ensure a connection is established at the necessary time for device management. In some examples, forwarding messages of different protocols to the appropriate device in the networked environment may require large memory and/or processing allocation in the secondary device.

To address these issues, in the examples described herein, a remote management service may establish a connection with a device protected by a firewall in a local network without receiving a connection request from any device in the local network. In such examples, the device in the local network may forward device management requests in real time from the remote management service to the imaging device via the local network. In such examples, the device management request may be a wrapped message and the device may unwrap or extract the message and forward the extracted or unwrapped message to the local network. In this manner, examples described herein may significantly simplify forwarding of device management requests within the local network.

Referring now to the drawings, FIG. 1 is a block diagram of an example computing device 100 to provide a first message 105 from a remote management service to a local network. In the example of FIG. 1, computing device 100 includes a processing resource 110 and a machine-readable storage medium 120 comprising (e.g., encoded with) instructions 122, 124, 126, 128, 130, and 132 executable by processing resource 110. In some examples, storage medium 120 may include additional instructions. In some examples, instructions 122, 124, 126, and 128, 130, 132, and any other instructions described herein in relation to storage medium 120, may be stored on a machine-readable storage medium remote from but accessible to computing device 100 and processing resource 110 (e.g., via a computer network). In some examples, instructions 122, 124, 126, 128, 130, and 132 may be instructions of a computer program, computer application ("app"), agent, or the like, of computing device 100. In other examples, the functionalities described herein in relation to instructions 122, 124, 126, 128, 130, and 132 may be implemented as engines comprising any combination of hardware and programming to implement the functionalities of the engines, as described below.

In examples described herein, a processing resource may include, for example, one processor or multiple processors included in a single computing device (as shown in FIG. 1) or distributed across multiple computing devices. A "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution of instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

As used herein "local network" refers to a computing network protected by a firewall in which devices may be connected to each other. The devices may be connected to each other through a wired connection (e.g., local area network (LAN), etc.) or a wireless connection (e.g., wireless local area network (WLAN), Wi-Fi, Bluetooth, etc.).

In the example of FIG. 1, instructions 122 may passively acquire (i.e., receive) in computing device 100 a first message 105 from a remote management service through a firewall 150. In such example, the computing device 100 may acquire the first message 105 without prior communication with or "polling" of the remote management service for the first message. As used herein "polling" or to "poll" refers to a transmission by a first device of a request for information from a second device.

In the examples described herein, the first message 105 may be a real time management request. The first message 105 may be a wrapped message of a first protocol. As used herein a "wrapped" message refers to a message (e.g., computer instructions or commands) of a first protocol which contains a message of a second protocol encapsulated or "tunneled" therein. In some examples, the first protocol and the second protocol may be the same protocol.

In the examples described herein, the first protocol may be a protocol to traverse a firewall. The first protocol may be an application layer protocol, such as a protocol for instant or real time communication ("instant communication protocol") or a protocol to establish persistent connection ("persistent connection protocol"). For example, Extensible Messaging and Presence Protocol (XMPP) is an instant communication protocol and a persistent communication protocol which may traverse firewalls. Through XMPP, a message may be sent in real time without receiving a prior request for the message from a target device receiving the message (i.e., a "push" transmission mechanism). In some examples, the first protocol may be long polling, WebSocket, Microsoft Message Queuing (MSMQ), Internet Message Access Protocol (IMAP), Internet Relay Chat (IRC), Windows Messenger Service, Session initiation Protocol (SIP), Multipurpose Internet Mail Extensions (MIME), etc.

In instructions 124, the first message 105 may be unwrapped into a second message 107 of a second protocol in the computing device 100. As used herein, to "unwrap" refers to the extraction of a message encapsulated in a wrapped message. The second protocol many be any protocol which may be wrapped into a persistent connection protocol or an instant communication protocol. In some examples, the second protocol may be an application protocol, such as a protocol to request a response ("request-response protocol"), with flexible payload size. For example, Hypertext Transfer Protocol (HTTP) is a request-response protocol which may be wrapped or embedded into XMPP and has flexibility in the payload size. In some examples, the second protocol may be File Transfer Protocol (FTP), Simple Mail Transfer Protocol (SMTP), Bayeux protocol, etc. The second message may be a real time device management request.

In instructions 126, the second message 107 of the second protocol may be provided to the computing device 100 for transmission to a destination of the second message 107. The destination of the second message 107 may be determined based on an IP address. In some examples, the second message 107 may be provided to an output communication port of computing device 100 for transmission via a local network. As used herein, a "communication port" may be a network interface device (e.g., interface card) to send and/or receive a message to a local network The computing device 100 may have communication ports to transmit messages to and/or receive messages from the local network. In some examples, the output communication port may be an output communication port communicating via HTTP ("HTTP output communication port").

In the example of FIG. 1, the second message 107 may be a wrapped message encapsulating a third message 109 of a third protocol. In some examples, the IP address of the destination of the second message 107 may be an input communication port of the computing device 100. If the IP address of the destination of the second message 107 is an input communication port of the computing device 100, the computing device 100 may provide the second message 107 to the input communication port without providing the second message 107 to the local network. In some examples, the input communication port may be an input communication port communicating via HTTP ("HTTP input communication port"). In some examples, the HTTP output communication port and HTTP input communication port may be in the same interface device.

In such examples, in instructions 128, the second message 107 may be received (i.e., passively acquired) by an input communication port of the computing device 100.

In instructions 130, the second message 107 may be unwrapped into a third message 109 of a third protocol. The third message 109 may be a real time device management request. In such examples, the third protocol may be a protocol to communicate with or manage a computing device ("device management protocol"). For example, a device management protocol may be XMPP, HTTP, Hypertext Transfer Protocol Secure (HTTPS), Simple Network Management Protocol (SNMP), Simple Object Access Protocol (SOAP), or any other protocol to communicate with a computing device. In some examples, the firewall may not allow messages of the third protocol to pass through the firewall. In an example, the third message 109 may be a device management request of SNMP. In an example, the device management request may be to alter a device setting of an imaging device (e.g., low power setting, double-sided printing setting, color printing setting, etc.).

In instructions 132, the third message 109 of the third protocol may be provided to the computing device 100 for transmission to a destination of the third message 109. The destination of the third message may be determined based on an IP address. The destination of the third message may be a computing device. In some examples, the third message 109 may be provided to an output communication port of computing device 100 for transmission via a local network. For example, the third message 109 may be provided to an imaging device in the local network which may communicate via SNMP.

In some examples, instructions 122, 124, 126, 128, 130, and 132 may be part of an installation package that, when installed, may be executed by processing resource 110 to implement the functionalities described herein in relation to instructions 122, 124, 126, 128, 130, and 132. In such examples, storage medium 120 may be a portable medium, such as a CD, DVD, flash drive, or a memory maintained by a computing device from which the installation package can be downloaded and installed. In other examples, instructions 122, 124, 126, 128, 130, and 132 may be part of an application, applications, or component already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-4.

Figure 2:
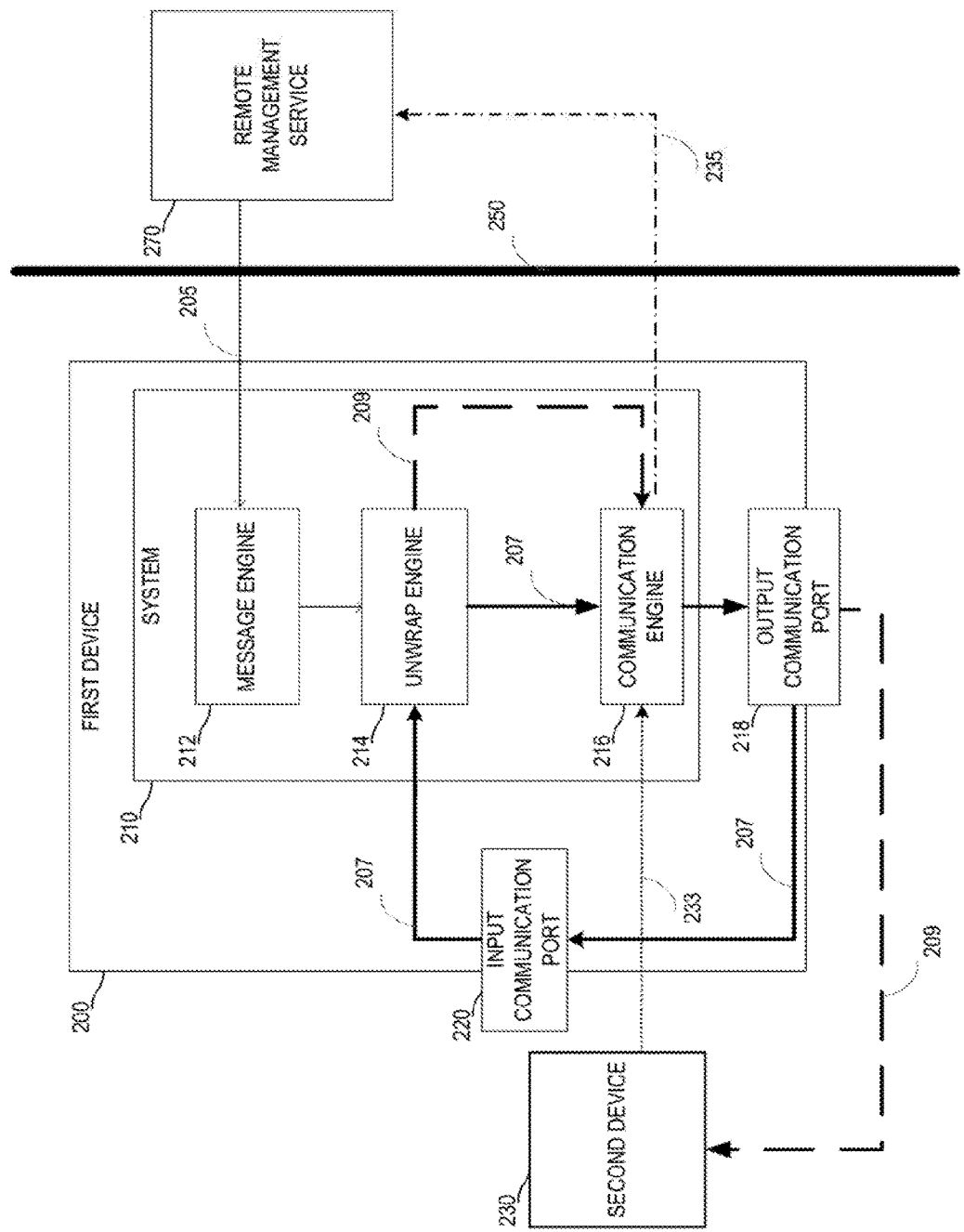
FIG. 2 is a block diagram of an example system to provide a device an unwrapped device management request from a remote management service.

FIG. 2 is a block diagram of an example system 210 to provide a second device 230 an unwrapped device management request from a remote management service 270. System 210 and second device 230 may be remote from one another and may communicate with one another via a local network. System 210 and remote management service 270 may be remote from each other and communicate via a computer network (e.g., the Internet). System 210 and remote management service 270 may be separate from each other by firewall 250. In some examples, system 210 may reside in a first device 200. First device 200 may be a computing device in a local network protected by a firewall 250. In the example of FIG. 2, system 210 includes at least engines 212, 214, and 216 which may be any combination of hardware and programming to implement the functionalities of the engines. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 212, 214, and 216. in such examples, system 210 may include the machine-readable storage medium storing the instructions and the processing resource to execute the instructions, or the machine-readable storage medium may be separate but accessible to system 210 and the processing resource.

In some examples, the instructions can be part of an installation package that, when installed, can be executed by the processing resource to implement at least engines 212. 214, and 216. In such examples, the machine-readable storage medium may be a portable medium, such as a CD, DVD, or flash drive, or a memory maintained by a computing device from which the installation package can be downloaded and installed. In other examples, the instructions may be part of an application, applications, or component already installed on system 210 including the processing resource. In such examples, the machine-readable storage medium may include memory such as a hard drive, solid state drive, or the like. In other examples, the functionalities of any engines of system 210 may be implemented in the form of electronic circuitry.

In the example of FIG. 2, message engine 212 may receive a first message 205 from the remote management service 270 through the firewall 250. First message 205 may be any type of message described above with respect to first message 105 of FIG. 1. First message 205 may be a wrapped message as described above with respect to FIG. 1.

In such an example, unwrap engine 214 may unwrap first message 205 into a second message 207. Second message 207 may be any type of message described above with respect to second message 107 of FIG. 1. As described above in relation to second message 107 of FIG. 1, second message 207 may be addressed to an input communication port of first device 200.

In communication engine 216, the second message 207 may be provided to a destination of second message 207. In the example of FIG. 2, second message 207 may be provided to an output communication port 218 of the first device 200 for transmission to the destination of the second message 207. In some examples, the second message 207 may be addressed to an input communication port 220 of first device 200. In some examples, input communication port 220 and output communication port 218 may be a single interface device to send and receive messages. In some examples, the second message 207 may be of a HTTP. In an example, the output communication port 218 may be an HTTP output communication port and the input communication port 220 may be communicate via HTTP.

If the second message 207 is addressed to the input communication port 220, first device 200 may provide the second message 207 to input communication port 220 as described above with relation to computing device 100 and second message 107 of FIG. 1. In the example of FIG. 2, the second message 207 may be addressed to input communication port 220. The second message 207 may be a wrapped message encapsulating a third message. In such an example, input communication port 220 may provide the received second message 207 to unwrap engine 214.

In the example of FIG. 2, unwarp engine 214 may unwrap second message 207 into a third message 209 of a third protocol and provide the third message 209 to communication engine 216. Third message 209 may be any type of message described above with respect to third message 107 of FIG. 1. The third message 209 may be addressed to second device 230. In such an example, communication engine 216 may provide third message 209 to output communication port 218 of first device 200. Output communication port 218 may provide the third message 209 to second device 230 via the local network protected by firewall 250.

In some examples, second device 230 may be an imaging device. Third message 209 may be of a protocol to communicate with or manage second device 230, in the example of FIG. 2, second device 230 may respond to third message 209 with a device management response 233. The second device 230 may provide device management response 233 to communication engine 216. In an example, second device 230 may provide device management response 233 to communication engine 216 directly or via input communication port 220 or any other input communication port of first device 200.

Communication engine 216 may provide the device management response 233 to the remote management service 270 through firewall 250. In the example of FIG. 2, communication engine 216 may wrap device management response 233 into a second protocol to generate a second device management response 235. Communication engine 216 may provide second device management response 235 to remote management service 270 through firewall 250. In some examples, the second protocol may be any protocol to traverse a firewall. For example, the second protocol may be XMPP, HTTP, HTTPS, etc.

FIG. 3 is a flowchart of an example method 300 for providing a management request message to a networked device from a remote management service. Although execution of method 300 is described below with reference to system 210 of FIG. 2 described above, other suitable systems for the execution of method 300 can be utilized (e.g., computing device 100). Additionally, implementation of method 300 is not limited to such examples.

At 302 of method 300, message engine 212 may receive in first device 200, connected to a local network, a first message 205 from a remote management service 270 through a firewall 250. In the example of FIG. 3, the first message 205 may be in XMPP.

At 304, unwrap engine 214 may unwrap the first message 205 into a second message 207 in the first device 200. In the example of FIG. 3, the second message 207 may be in HTTP.

At 306, communication engine 216 may provide second message 207 to first device 200 for transmission via output communication port 218 to a destination IP address of second message 207.

In the example of FIG. 3, the second message 207 may be a wrapped message addressed to input communication port 220 of first device 200. At 308, input communication port 220 may receive second message 207 in first device 200 when the IP address of input communication port 220 is the destination IP address of the second message 207.

At 310, unwrap engine 214 may unwrap the second message 207 received in input communication port 220 into a third message 209. In the example of FIG. 3, the third message 209 may be of SNMP.

At 312, communication engine 216 may provide third message 209 to first device 200 for transmission via output communication port 218 to second device 230 via the local network. For example, the second device 230 may be an imaging device and the third message a device management request to alter a setting of the imaging device or execute a print command.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4.

FIG. 4 is a flowchart of an example method 400 for providing a device management response to a remote management service which may be incorporated into the flowchart of FIG. 3. Although execution of method 400 is described below with reference to system 210 of FIG. 2 and the flowchart of FIG. 3 described above, other suitable systems for the execution of method 400 can be utilized (e.g., computing device 100). Additionally, implementation of method 400 is not limited to such examples.

At 402 of method 400, communication engine 216 may receive device management response 233 from second device 230. The device management response 233 may be in a device management protocol. In the example of FIG. 4, the device management response 233 may be in SNMP.

At 404, communication engine 216 may wrap device management response 233 into a second device management response 235. In an example, the second device management response 235 may be of any protocol to traverse firewall 250, as discussed above with relation to FIG. 2. In the example of FIG. 4, the second device management response 235 may be in HTTP.

At 406, communication engine 216 may provide the second device management response 235 to the remote management service 270 through firewall 250.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A non-transitory machine-readable storage medium comprising instructions executable by a processing resource to:

receive a first message of a first protocol through a firewall from a remote management service in a first device;

unwrap the first message into a second message of a second protocol in the first device;

provide the second message to an output communication port for transmission to a destination specified in the second message, wherein the output communication port is a port through which the first device transmits messages to a local network via a network interface device;

receive the second message in an input communication port ref the first device when the destination of the second message is the input communication port of the first device;

unwrap the second message into a third message of a third protocol in the first device; and provide the third message to the output communication port for transmission via the local network to a destination of the third message, wherein the third message is a device management request to perform a function in a computing device.

2. The storage medium of claim 1, wherein the firewall does not permit the third protocol to pass through the firewall.

3. The storage medium of claim 1, wherein the first protocol a persistent connection protocol.

4. The storage medium of claim 1, wherein the second protocol is a respond-request protocol.

5. The storage medium of claim 3, wherein the first protocol is an Extensible Messaging and Presence Protocol.

6. A system comprising:
a message engine to receive a first message of an Extensible Messaging and Presence Protocol through a firewall from a remote management service in a first device;
an unwrap engine to unwrap the first message into a second message; and
a communication engine to provide the second message to an output communication port for transmission to a destination IP address of the second message via a local network,
wherein the unwrap engine is further to unwrap the second message into a third message of a device management protocol in response to receipt of the second message via an input communication port, and
wherein the communication engine is further to provide the third message to a second device separate from the system via the local network.

7. The system of claim 6, wherein the input communication port is a port through which the system receives messages from the local network via a network interface device.

8. The system of claim 7, wherein the input communication port is a Hypertext Transfer Protocol port.

9. The system of claim 6, wherein the device management protocol is a Simple Network Management Protocol.

10. The system of claim 7, where network interface device is a network interface card.

11. The system of claim 6, wherein communication engine is further to:
receive a device management response from the second device via the local network; and
provide the device management response to the remote management service.

12. A method for controlling a device, comprising:
receiving, in a first device connected to a local network, a first message of an Extensible Messaging and Presence Protocol from a remote management service through a firewall;
unwrapping the first message into a second message of a Hypertext Transfer Protocol (HTTP) in the first device;
providing the second message to the first device for transmission via an output communication port to a destination IP address of the second message;
receiving the second message in an input communication port of the first device when the IP address of the input communication port is the destination IP address of the second message;
unwrapping the received second message into a third message of a Simple Network Management Protocol (SNMP); and
providing the third message to the first device for transmission via the output communication port to a second device via the local network.

13. The method of claim 12, wherein the third message is a device management request to alter a setting of an imaging device.

14. The method of claim 13, further comprising:
receiving an device management response message of SNMP from the second device;
wrapping the device management response into a second device management response of HTTP; and
providing the second device management response to the remote management service through a firewall.

15. The method of claim 13, wherein the device management request is a command to enter a low power mode of the imaging device.

* * * * *

UNITED STATES PATENT AND TRADEMARK OFFICE
CERTIFICATE OF CORRECTION

PATENT NO. : 10,069,795 B2
APPLICATION NO. : 15/320231
DATED : September 4, 2018
INVENTOR(S) : Timothy P Blair et al.

Page 1 of 1

It is certified that error appears in the above-identified patent and that said Letters Patent is hereby corrected as shown below:

In the Claims

In Column 9, Line 2, Claim 1, delete "ref" and insert -- of --, therefor.

In Column 9, Line 16, Claim 3, after "protocol" insert -- is --.

In Column 10, Line 3, Claim 10, delete "where" and insert -- wherein the --, therefor.

Signed and Sealed this
Nineteenth Day of November, 2019

Andrei Iancu
*Director of the United States Patent and Trademark Office*